United States Patent
Roorda et al.

(10) Patent No.: US 11,079,551 B2
(45) Date of Patent: Aug. 3, 2021

(54) LIQUID CRYSTAL ON SILICON ELEMENT FOR DUAL-FUNCTIONALITY BEAM STEERING IN WAVELENGTH SELECTIVE SWITCHES

(71) Applicant: Lumentum Operations LLC, San Jose, CA (US)

(72) Inventors: Peter David Roorda, Ottawa (CA); Paul Colbourne, Ottawa (CA); Sheldon McLaughlin, Ottawa (CA)

(73) Assignee: Lumentum Operations LLC, San Jose, CA (US)

( * ) Notice: Subject to any disclaimer, the term of this patent is extended or adjusted under 35 U.S.C. 154(b) by 0 days.

(21) Appl. No.: 16/717,559

(22) Filed: Dec. 17, 2019

(65) Prior Publication Data
US 2020/0209485 A1 Jul. 2, 2020

Related U.S. Application Data

(60) Provisional application No. 62/787,558, filed on Jan. 2, 2019.

(51) Int. Cl.
*H04J 14/02* (2006.01)
*G02B 6/35* (2006.01)
(Continued)

(52) U.S. Cl.
CPC ....... *G02B 6/3518* (2013.01); *G02B 26/0833* (2013.01); *H04J 14/0212* (2013.01);
(Continued)

(58) Field of Classification Search
None
See application file for complete search history.

(56) References Cited

U.S. PATENT DOCUMENTS

| 6,711,316 B2 | 3/2004 | Ducellier |
| 7,302,134 B2 | 11/2007 | Ducellier |

(Continued)

OTHER PUBLICATIONS

Yuan et al: "Fully Integrated N×N MEMS Wavelength Selective Switch with 100% Colorless Add-Drop Ports",OFC/NFOEC 2008, paper OWC2 (Year: 2008).*

(Continued)

*Primary Examiner* — Li Liu
(74) *Attorney, Agent, or Firm* — Harrity & Harrity, LLP

(57) ABSTRACT

An optical device may include a monolithic beam steering engine. The device may include a twin M×N wavelength selective switch (WSS) including a first M×N WSS and a second M×N WSS. The first M×N WSS may include a first panel section of the monolithic beam steering engine to perform first beam steering of first beams, wherein the first beam steering is add/drop port beam steering; and a second panel section of the monolithic beam steering engine to perform second beam steering of second beams, wherein the second beam steering is common port beam steering. The first M×N WSS may include a first optical element aligned to the monolithic beam steering engine to direct one of the first beams or the second beams relative to the other of the first beams or the second beams, such that the first beams are directed in a different direction from the second beams.

20 Claims, 8 Drawing Sheets

(51) Int. Cl.
  *G02B 26/08* (2006.01)
  *G02B 6/293* (2006.01)
(52) U.S. Cl.
  CPC ........ *G02B 6/29383* (2013.01); *G02B 6/3546* (2013.01); *G02B 6/3594* (2013.01)

(56) References Cited

U.S. PATENT DOCUMENTS

| | | | |
|---|---|---|---|
| 8,045,854 B2 | 10/2011 | Colbourne | |
| 8,300,995 B2 | 10/2012 | Colbourne | |
| 10,367,596 B1* | 7/2019 | Lu | H04J 14/0212 |
| 2014/0072302 A1* | 3/2014 | Iwama | G02B 6/356 |
| | | | 398/48 |
| 2014/0205291 A1* | 7/2014 | Suzuki | G02B 6/3518 |
| | | | 398/48 |
| 2014/0255026 A1* | 9/2014 | Roorda | H04J 14/0212 |
| | | | 398/49 |
| 2014/0355984 A1* | 12/2014 | Yuan | H04J 14/0212 |
| | | | 398/48 |
| 2015/0188656 A1* | 7/2015 | Sakurai | G02B 6/356 |
| | | | 398/49 |
| 2015/0208144 A1* | 7/2015 | Holmes | H04Q 11/0003 |
| | | | 398/48 |
| 2016/0234574 A1* | 8/2016 | Wagener | H04J 14/0212 |
| 2016/0234575 A1* | 8/2016 | Wagener | H04Q 11/0005 |
| 2016/0234576 A1* | 8/2016 | Suh | G02B 6/3534 |
| 2016/0316281 A1* | 10/2016 | Keyworth | H04J 14/0217 |
| 2020/0073056 A1* | 3/2020 | Suh | G02B 6/3502 |

OTHER PUBLICATIONS

Shifu Yuan et al., "Fully Integrated N×N MEMS Wavelength Selective Switch with 100% Colorless Add-Drop Ports". 2007, 3 pages.
Leonid Pascar et al., "Port-Reconfigurable, Wavelength-Selective Switch Array for Colorless/Directionless/Contentionless Optical Add/Drop Multiplexing", 2015, 3 pages.
Nicolas K. Fontaine et al., "N×M Wavelength Selective Crossconnect with Flexible Passbands", 2012, 3 pages.

* cited by examiner

LIQUID CRYSTAL ON SILICON ELEMENT FOR DUAL-FUNCTIONALITY BEAM STEERING IN WAVELENGTH SELECTIVE SWITCHES

RELATED APPLICATION(S)

This application claims priority to U.S. Provisional Patent Application No. 62/787,558, filed on Jan. 2, 2019, and entitled "M×N WAVELENGTH SELECTIVE SWITCH USING A SINGLE LIQUID CRYSTAL ON SILICON PANEL," the content of which is incorporated by reference herein in its entirety.

TECHNICAL FIELD

The present disclosure relates to an M×N wavelength selective switch (WSS) and to an M×N WSS that includes a multi-function liquid crystal on silicon (LCOS) panel to provide add/drop port beam steering and common port beam steering.

BACKGROUND

An M×N WSS is a device capable of independently routing any wavelength channel (e.g., a wavelength channel included in an optical signal comprising one or more wavelength channels) from any inbound port of the M×N WSS to any outbound port of the M×N WSS. In some cases, an M×N WSS may, along with one or more other devices, be included in an optical node (e.g., a node in a dense wavelength division multiplexed (DWDM) optical communications system) in order to support add/drop of optical signals at the optical node. In such an optical node, use of the M×N WSS may support add/drop such that a given wavelength channel can be added to or dropped from any degree of the optical node. The M×N WSS may include a set of beam steering optical elements to direct beams between input ports, output ports, common ports, and/or the like.

SUMMARY

According to some possible implementations, an optical device may include a monolithic beam steering engine. The device may include a twin M×N wavelength selective switch (WSS) including a first M×N WSS and a second M×N WSS. The first M×N WSS may include a first panel section of the monolithic beam steering engine to perform first beam steering of first beams, wherein the first beam steering is add/drop port beam steering; and a second panel section of the monolithic beam steering engine to perform second beam steering of second beams, wherein the second beam steering is common port beam steering. The first M×N WSS may include a first optical element aligned to the monolithic beam steering engine to direct one of the first beams or the second beams relative to the other of the first beams or the second beams, such that the first beams are directed in a different direction from the second beams.

According to some possible implementations, an M×N WSS may include a monolithic beam steering engine. The monolithic beam steering engine may include a first panel section to perform first beam steering of first beams, wherein the first beam steering is add/drop port beam steering; and a second panel section to perform second beam steering of second beams, wherein the second beam steering is common port beam steering. The M×N WSS may include at least one optical element aligned to the beam steering engine to direct one of the first beams or the second beams relative to the other of the first beams or the second beams, such that the first beams are directed in a different direction from the second beams.

According to some possible implementations, a method of controlling an M×N WSS may include configuring a first panel section of a monolithic beam steering engine to perform first beam steering of first beams; and configuring a second panel section of the monolithic beam steering engine to perform second beam steering of second beams, wherein one of the first panel section or the second panel section is aligned to at least one optical element to separate a direction of the first beams from the second beams.

DETAILED DESCRIPTION

The following detailed description of example implementations refers to the accompanying drawings. The same reference numbers in different drawings may identify the same or similar elements.

In an optical communications system, wavelength selective switches (WSSs) may be deployed to provide add and drop functionality at nodes of the optical communications system. The WSS may have beam steering elements, such as microelectromechanical system (MEMS) mirror arrays to provide beam steering. However, to satisfy a demand for increasing data transmission capacity in optical communications systems, a quantity of optical nodes and associated WSSs that are deployed may be increased. Available space for optical nodes and associated WSSs may remain fixed even as a quantity of optical components that are deployed increases. Thus, in order to increase capacity in an optical node, WSSs should be capable of beam steering in reduced form factors. Moreover, to enable rapid deployment of optical nodes to increase optical communications system coverage, a cost associated with components of a WSS should be decreased.

However, using a dedicated MEMS mirror array for beam steering with a WSS may result in an increased form factor to position the dedicated MEMS mirror array within an optical path of the WSS. Moreover, MEMS mirror arrays may be expensive, which may provide a limit on a rate at which new optical nodes can be deployed to increase capacity within an optical communications system. Furthermore, MEMS mirror arrays may be subject to issues with durability as a result of mechanical failures in components of the MEMS mirror arrays.

Some implementations described herein provide a design for an M×N WSS that is capable of performing beam steering for an optical communications system using a multi-function beam steering engine. For example, rather than including both a liquid crystal on silicon (LCOS) panel and a MEMS mirror array to perform beam steering within the WSS, the WSS may use a single LCOS panel configured into multiple panel sections to perform beam steering for both common ports and add/drop ports. In this way, a quantity of components within the WSS is decreased, thereby reducing cost, size, complexity, failure rate, and/or the like. Moreover, by using steering angles less than a threshold, an insertion loss penalty of the LCOS panel is reduced to an acceptable amount for optical communications system deployment. Moreover, by using single direction beam steering (e.g., positive beam steering angles), an LCOS panel may achieve acceptable isolation performance for optical communications systems, as described in more detail herein.

Figure 1:
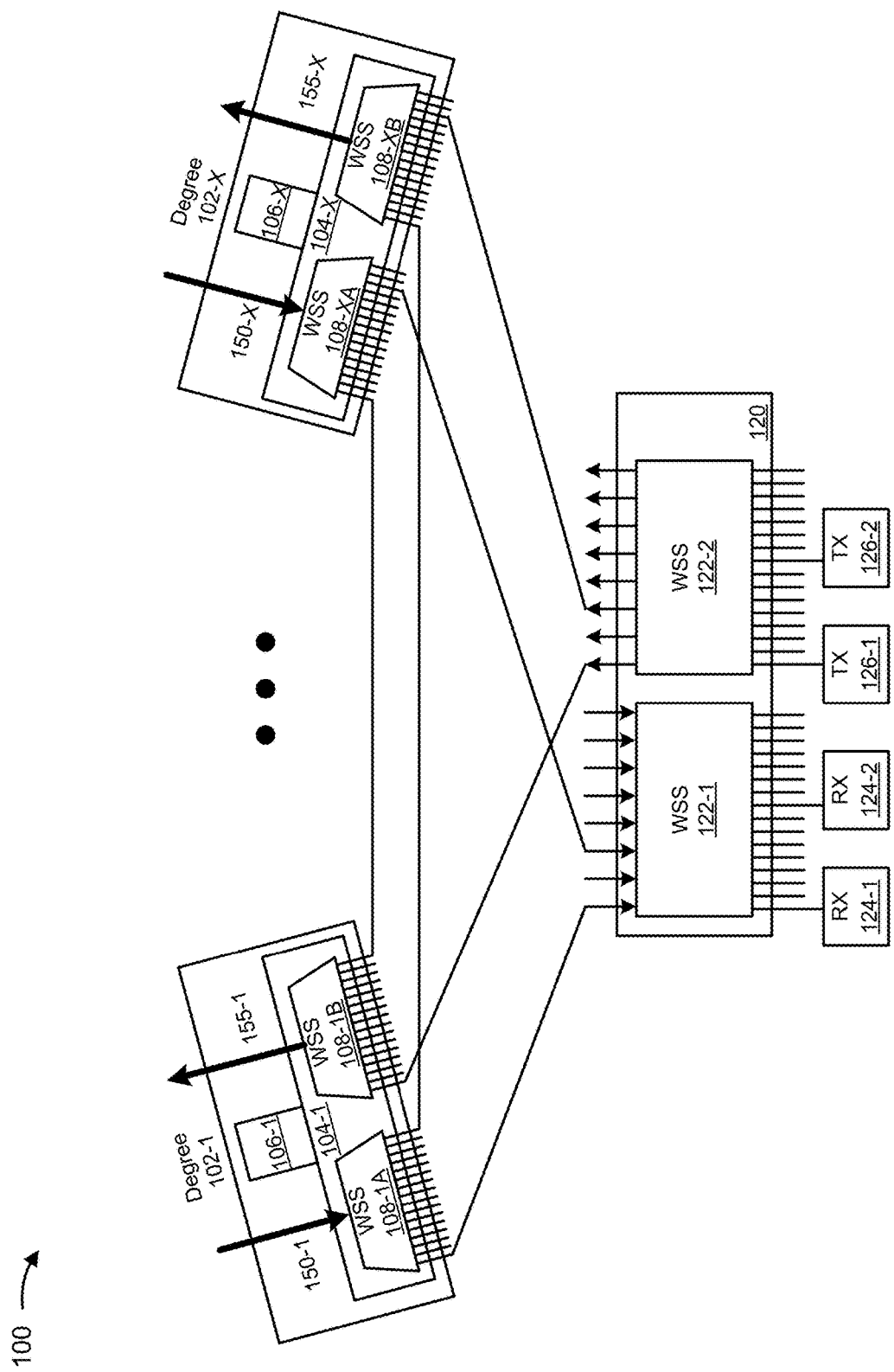
FIG. 1 is a diagram of an optical node including a wavelength selective switch (WSS).

FIG. 1 is a diagram of an example optical node 100 using a WSS described herein. As shown in FIG. 1, optical node 100 includes a set of degrees 102-1 through 102-X (X>1). As shown, each degree 102 includes a multiplexing/demultiplexing stage 104 (e.g., 104-1 through 104-X) and an optical channel monitor 106 (e.g., 106-1 through 106-X). As further shown, each multiplexing/demultiplexing stage 104 includes a pair of WSSs 108 (e.g., WSS 108-1A and WSS 108-1B through WSS 108-XA and WSS 108-XB). As shown, a first WSS 108 of each pair (e.g., WSS 108-1A, WSS 108-XA) is coupled to an input fiber (e.g., 150-1, 150-X) associated with a respective degree 102, while a second WSS of each pair (e.g., WSS 108-1B, WSS 108-XB) is coupled to an output fiber (e.g., 155-1, 155-X) associated with the respective degree 102.

As further shown, optical node 100 includes add/drop stage 120. As shown, add/drop stage 120 includes a set of WSSs 122 (e.g., WSS 122-1 and WSS 122-2). WSS 122 is a hybrid add/drop device that supports colorless-directionless-contentionless (CDC) (e.g., each transmitter can be any wavelength, send signals in any direction to any degree, and multiple copies of the same wavelength can be routed independently from different transmitters to different degrees) add/drop of optical signals at optical node 100. As shown in FIG. 1, a first WSS 122 (e.g., WSS 122-1), associated with dropping optical signals at optical node 100, may be coupled to a set of optical receivers (RX) 124. While not shown, in some cases, the first WSS 122 may be coupled to a set of splitters, where the set of splitters is coupled to the set of optical receivers (RX) 124. Similarly, a second WSS 122 (e.g., WSS 122-2), associated with adding optical signals at optical node 100, may be coupled to a set of optical transmitters (TX) 126.

A degree 102 bi-directionally connects optical node 100 to another optical node or an endpoint node of, for example, a DWDM optical communications system. For example, WSS 108-1A may receive an input signal from another optical node via an optical fiber. Here, if a portion of the input signal (e.g., one or more wavelength channels) is to be dropped, then WSS 108-1A may selectively provide the portion of the input signal (e.g., an optical signal including the one or more wavelength channels, sometimes referred to as a wavelength channel sub-beam) on a drop path to one or more optical receivers 124 (e.g., a path from WSS 108-1A, via WSS 122-1, to one or more optical receivers 124). Further, if a portion of the input signal is to continue on an outbound optical fiber of another degree 102 (e.g., is not to be dropped), then WSS 108-1A may selectively provide the portion of the input signal on an express path to an outbound WSS 108 associated with the other degree 102 (e.g., a path from WSS 108-1A to WSS 108-XB).

As another example, WSS 108-1B may provide an output signal to another optical node via an optical fiber. Here, WSS 108-1B may receive an optical signal, added at optical node 100, on an add path from optical transmitter 126 (e.g., a path from optical transmitter 126, via WSS 122-2, to WSS 108-1B), and provide an output signal, including the optical signal, via the optical fiber. Similarly, WSS 108-1B may receive a portion of an input signal on an express path from an inbound WSS 108 (e.g., WSS 108-XA) associated with another degree 102, and may provide an output signal, including the portion of the input signal, via the optical fiber.

In optical node 100, any wavelength may be switched to any fiber direction (any degree), and multiple channels of the same wavelength can be concurrently routed between a transmitter/receiver of optical node 100 and a target outbound/inbound optical fiber of optical node 100. In other words, optical node 100 is capable of achieving CDC add/drop.

The number and arrangement of devices shown and described in association with FIG. 1 are provided as examples. In practice, optical node 100 may include additional devices, fewer devices, different devices, differently arranged devices, and/or differently sized devices than those shown in FIG. 1.

Figure 2:
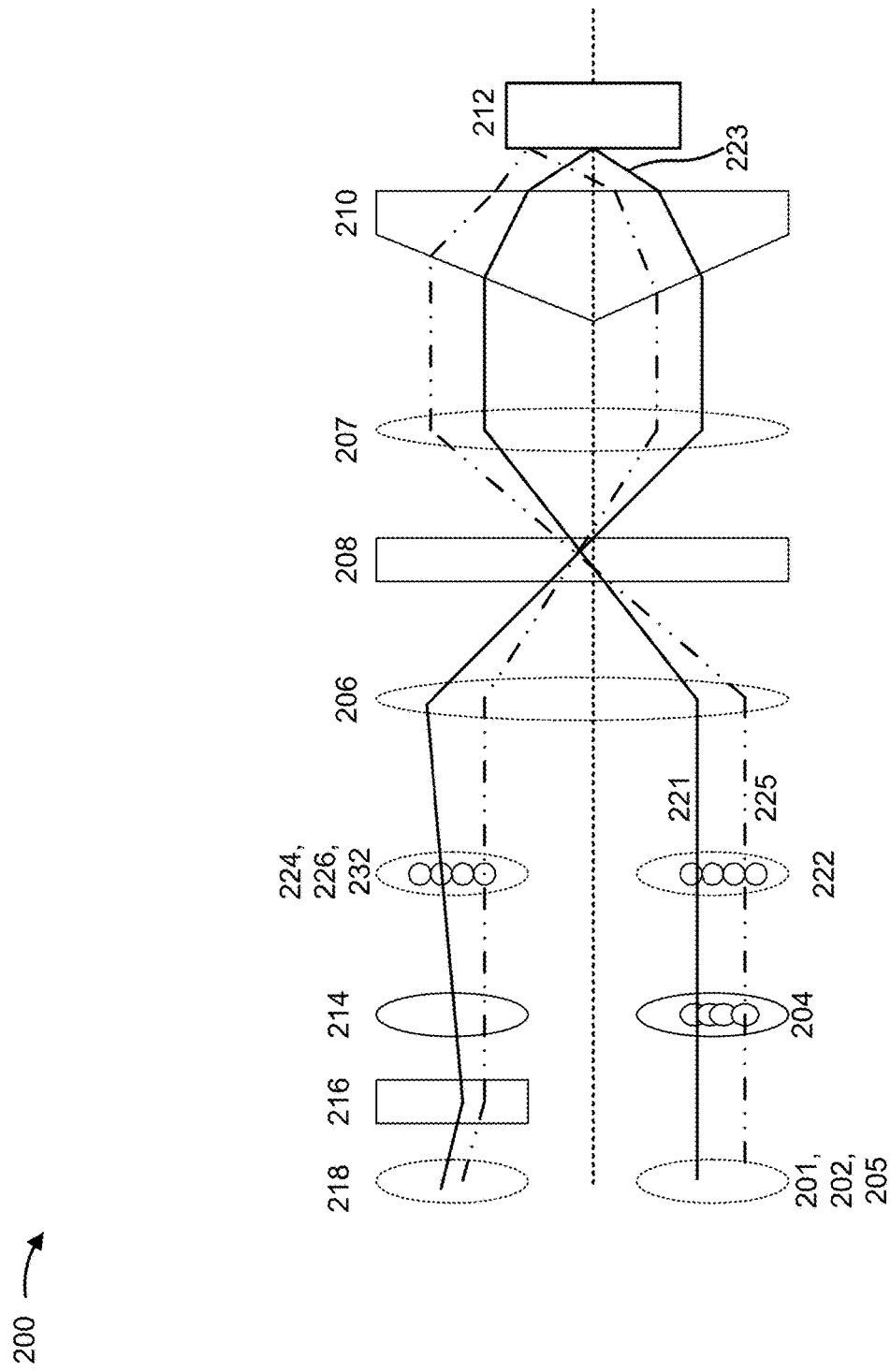
FIG. 2 is a diagram of a wavelength selective switch (WSS) with a microelectromechanical system (MEMS) array.

FIG. 2 is a diagram of an example 200 described herein. Example 200 is an example of a WSS with two MEMS mirror arrays (e.g., MEMS micromirror arrays).

As shown in FIG. 2, example implementation 200 includes an M×N WSS 200, which includes an input fiber array 202 of M input fibers, an input microlens array 204 of M microlenses, a collimating lens 206, a focusing lens 207, a diffraction grating 208, a roof prism 210, a first MEMS micromirror array 212, a switching lens 214, a second MEMS micromirror array 216, and an output fiber array 218 of N output fibers. In some implementations, add/drop ports associated with output fiber array 218 may connect to a single common port. In contrast, common ports associated with input fiber array 202 and an input fiber 201 may be connected to multiple add/drop ports to independently direct different wavelengths to the different add/drop ports.

In operation, input fiber 201 of input fiber array 202 emits a diverging light beam 221, which is collimated by a corresponding microlens of the microlens array 204 to form a spot 222. Diffraction grating 208 spreads the beam 221 into a plurality of wavelength channel sub-beams (e.g., each sub-beam carries a separate wavelength channel). Diffraction grating 208 disperses the plurality of the wavelength channel sub-beams, which are coupled by the focusing lens 207, through roof prism 210, onto MEMS micromirror array 212, such that each of the micromirrors thereof is illuminated by a corresponding set of wavelength channel sub-beams of a corresponding set of M input fibers. In some cases, MEMS micromirror array 212 may be an LCOS panel. The beam angle of each wavelength channel sub-beam reflected from a corresponding MEMS micromirror is determined by a tilt of the corresponding MEMS micromirror, which is configured based on a control signal applied to each MEMS micromirror of MEMS micromirror array 212.

A reflected wavelength channel sub-beam 223 of beam 221 propagates back through roof prism 210, focusing lens 207, diffraction grating 208, and lens 206. Lens 206 focuses wavelength channel sub-beam 223 into a spot 224 at an intermediate focal plane 226. Switching lens 214 acts as an angle-to-offset converter. Since the beam angles of individual wavelength channel sub-beams are individually determined by the angle of tilt of corresponding micromirrors of the MEMS micromirror array 212, then the wavelength channel sub-beams emitted by the input fiber 201 can be individually directed to fall on a corresponding micromirror of the second MEMS micromirror array 216.

The second MEMS micromirror array 216 has N micromirrors corresponding to N output fibers of output fiber array 218. Second MEMS micromirror array 216 couples a wavelength channel sub-beam falling onto a micromirror thereof to an output fiber corresponding to the micromirror. In this way, any one of a set of K wavelength channel sub-beams in the input fiber 201 is independently switchable into any particular one of the N output fibers, depending upon the individually controllable tilt angles of corresponding MEMS micromirrors of the MEMS micromirror arrays 212 and 216. Similarly, wavelength channel sub-beams 225 emitted by an input fiber 205 of the input fiber array 202 are independently switchable. However, providing two MEMS micromirror arrays (e.g., MEMS micromirror arrays 212 and 216) or a MEMS micromirror array (e.g., MEMS micromirror array 216) and an LCOS panel (e.g., rather than MEMS micromirror array 212) may result in an excessively large form factor, increased cost, reduced durability, and/or the like. Thus, in some implementations described herein, a single LCOS panel may replace both MEMS micromirror arrays shown in FIG. 2. Although some implementations are described herein in terms of a particular layout of optical components, as shown, other layouts are possible.

As indicated above, FIG. 2 is provided merely as an example. Other examples may differ from what is described with regard to FIG. 2.

Figure 3A:
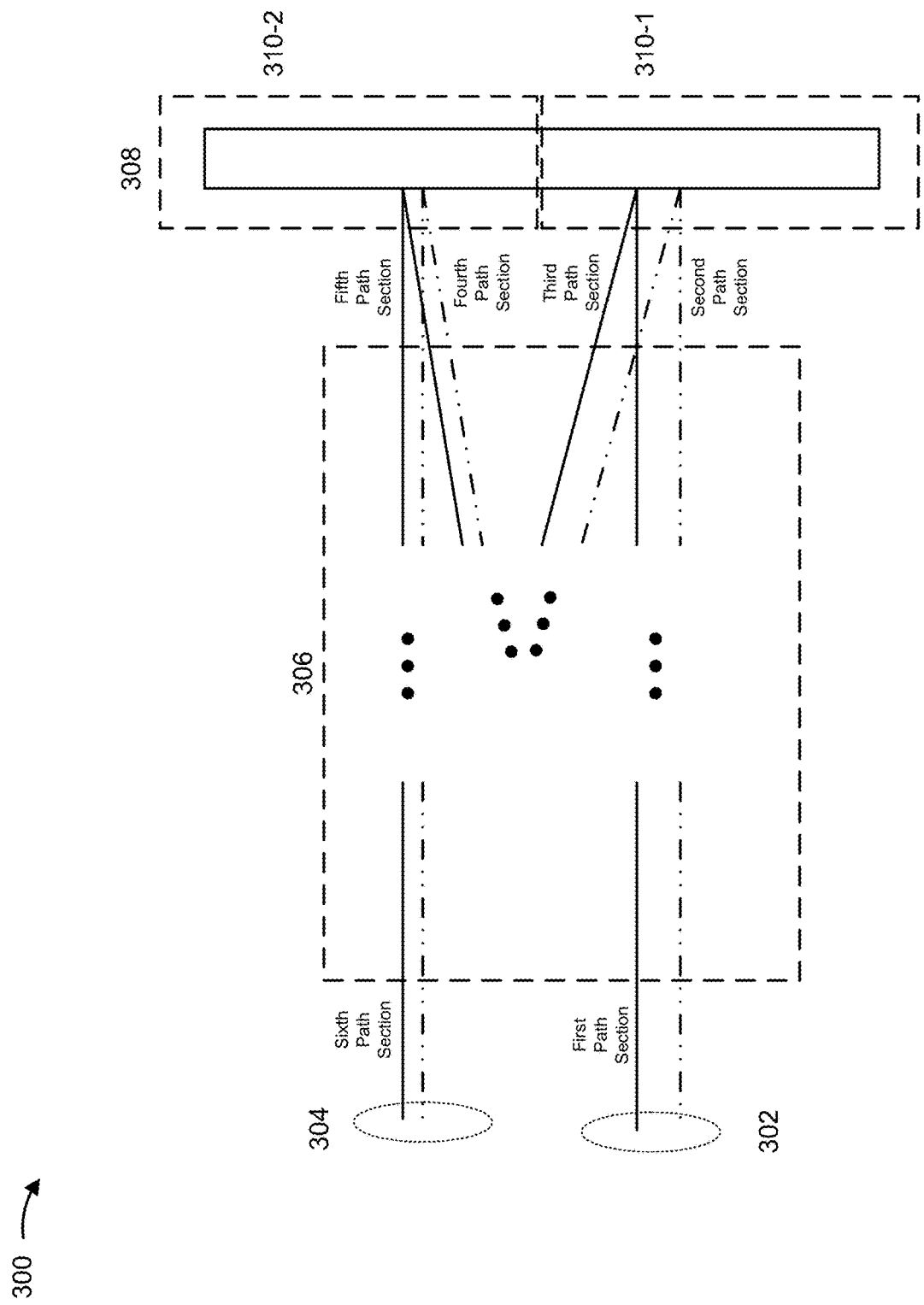
FIGS. 3A and 3B are diagrams of an M×N WSS with a liquid crystal on silicon (LCOS) panel to perform add/drop port beam steering and common port beam steering.
Figure 3B:
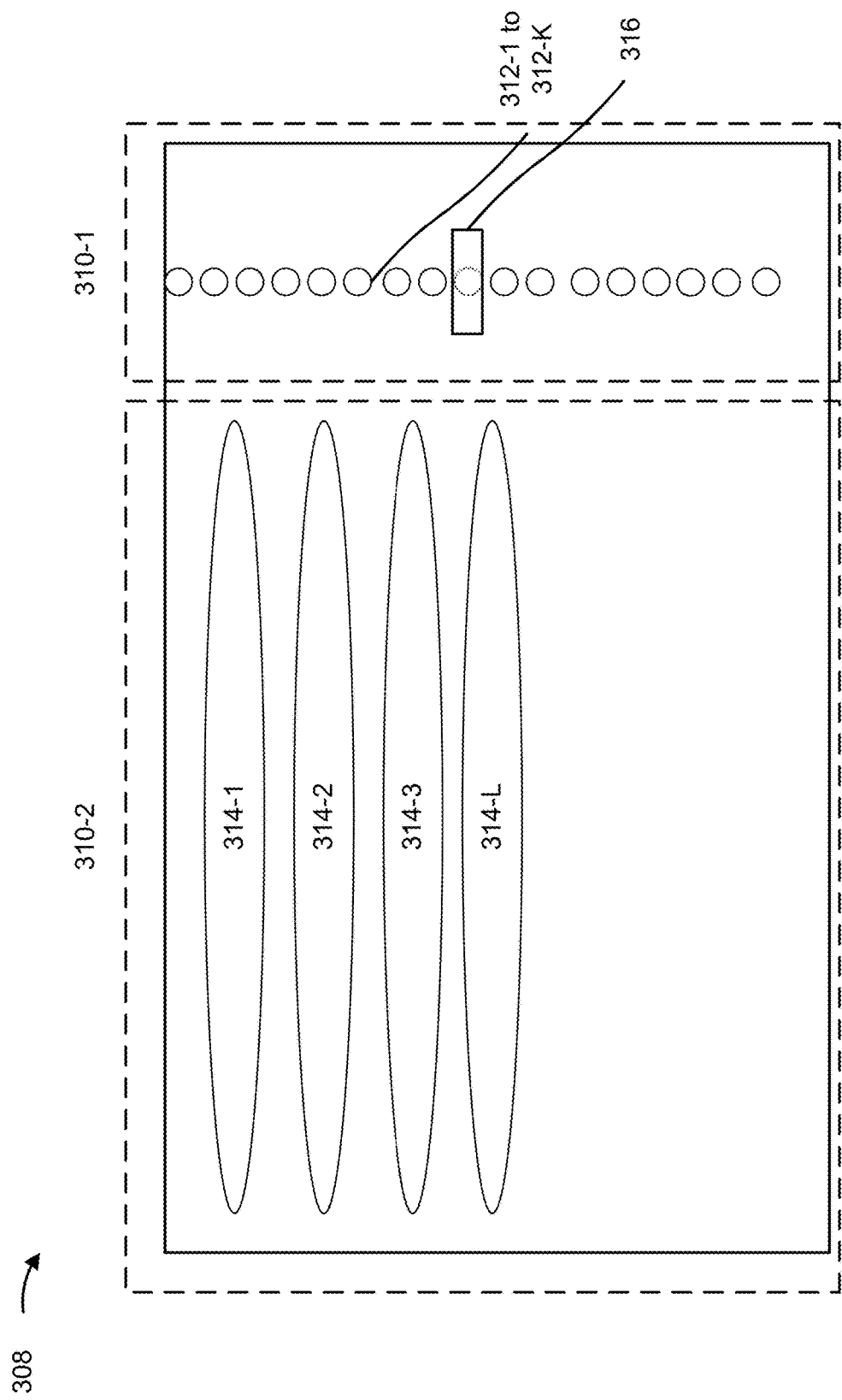

FIGS. 3A and 3B are diagrams of an example implementation of an M×N WSS 300 described herein.

As shown in FIG. 3A, M×N WSS 300 may include an input fiber array 302 (e.g., which may correspond to input fiber array 202), and output fiber array 304 (e.g., which may correspond to output fiber array 218), a set of optical components 306 (e.g., which may correspond to one or more of components 204, 206, 208, 210, 214, and/or the like), and a steering engine 308. Steering engine 308 may be configured to form two LCOS panel sections 310-1 and 310-2. For example, steering engine 308 may receive a control signal (e.g., from a control device of M×N WSS 300 and may configure two sets of pixels of steering engine 308 to form two independent steering engines 308 from the single steering engine 308.

In some implementations, steering engine 308 may include a set of path sections, such as a first path section between input fiber array 302 and a first subset of optical components 306, a second path section between the first subset of optical components 306 and a first panel section 310-1, a third path section between first panel section 310-1 and a second subset of optical components 306, a fourth path section between the second subset of optical components 306 and a second panel section 310-2, a fifth path section between the second panel section 310-2 and a third subset of optical components 306, and/or a sixth path section between the third subset of optical components 306 and output fiber array 304. Although optical components 306 are shown as being in an optical path of each path section, some path sections may include no optical components 306.

In some implementations, steering engine 308 may be a monolithic steering engine. For example, steering engine 308 may be a single structure that is dividable, using control signaling, into multiple panel sections to perform multiple beam steering functionalities. In this case, steering engine 308 may be divided into a first panel section 310-1 to perform first beam steering of first beams (e.g., non-dispersed spectrum beams associated with add/drop ports of M×N WSS 300) and a second panel section 310-2 to perform second beam steering of second beams (e.g., dispersed spectrum beams associated with common ports of M×N WSS 300).

In some implementations, steering engine 308 may be an LCOS panel. For example, steering engine 308 may be an LCOS panel (e.g., an LCOS phased array) with pixels of the LCOS panel configured to perform beam steering functionalities, such as a first set of pixels being configured to form first panel section 310-1 and a second set of pixels being configured to form second panel section 310-2. In this case, first panel section 310-1 may correspond to MEMS micromirror array 212 in FIG. 2 and perform beam steering for non-dispersed spectrum beams associated with add/drop port ports of M×N WSS 300 (e.g., which may be a first subset of ports of input fiber array 302 and output fiber array 304). An optical path of the set of optical components 306 is arranged such that rather than directing dispersed beams toward another, separate beam steering component (e.g., MEMS micromirror array 216), the optical path may direct a dispersed beam toward panel section 310-2 for dispersed beam steering associated with common ports of M×N WSS 300 (e.g., which may be a second subset of ports of input fiber array 302 and output fiber array 304). In this way, a single steering engine 308 may replace multiple MEMS micromirror arrays or replace a combination of an LCOS panel and a micromirror array, thereby achieving reduced form factor, reduced cost, and improved durability.

In some implementations, steering engine 308 may achieve less than a threshold insertion loss. For example, steering engine 308 may achieve an insertion loss of less than 9 decibels (dB) in connection with beam steering. In this case, steering engine 308 may restrict steering angles to less than a threshold angle and/or may perform beam steering for less than a threshold quantity of ports to ensure performance of less than the threshold insertion loss.

FIG. 3B shows a plan view of steering engine 308. For example, panel section 310-1 may be configured with areas 312-1 through 312-K to perform non-dispersed beam steering for beams with a concentrated beam profile, as shown. In contrast, panel section 310-2 may be configured with areas 314-1 through 314-L to perform dispersed beam steering for beams with a dispersed spectrum, as shown. Areas 314 may be larger than areas 312 to enable reception of different wavelengths of light of the beams with a dispersed spectrum. For example, each of areas 314-1 through 314-L may be a region at which steering engine 308 receives of multiple spots corresponding to multiple wavelengths of light of a corresponding beam. In this case, for a single 4×16 WSS, steering engine 308 may include a set of 17 areas 312 for beam add/drop port beam steering (1 of which may be blocked using a reflector 316) and a set of 4 areas 314 for common port beam steering.

As indicated above, FIGS. 3A and 3B are provided merely as one or more examples. Other examples may differ from what is described with regard to FIGS. 3A and 3B.

Figure 4A:
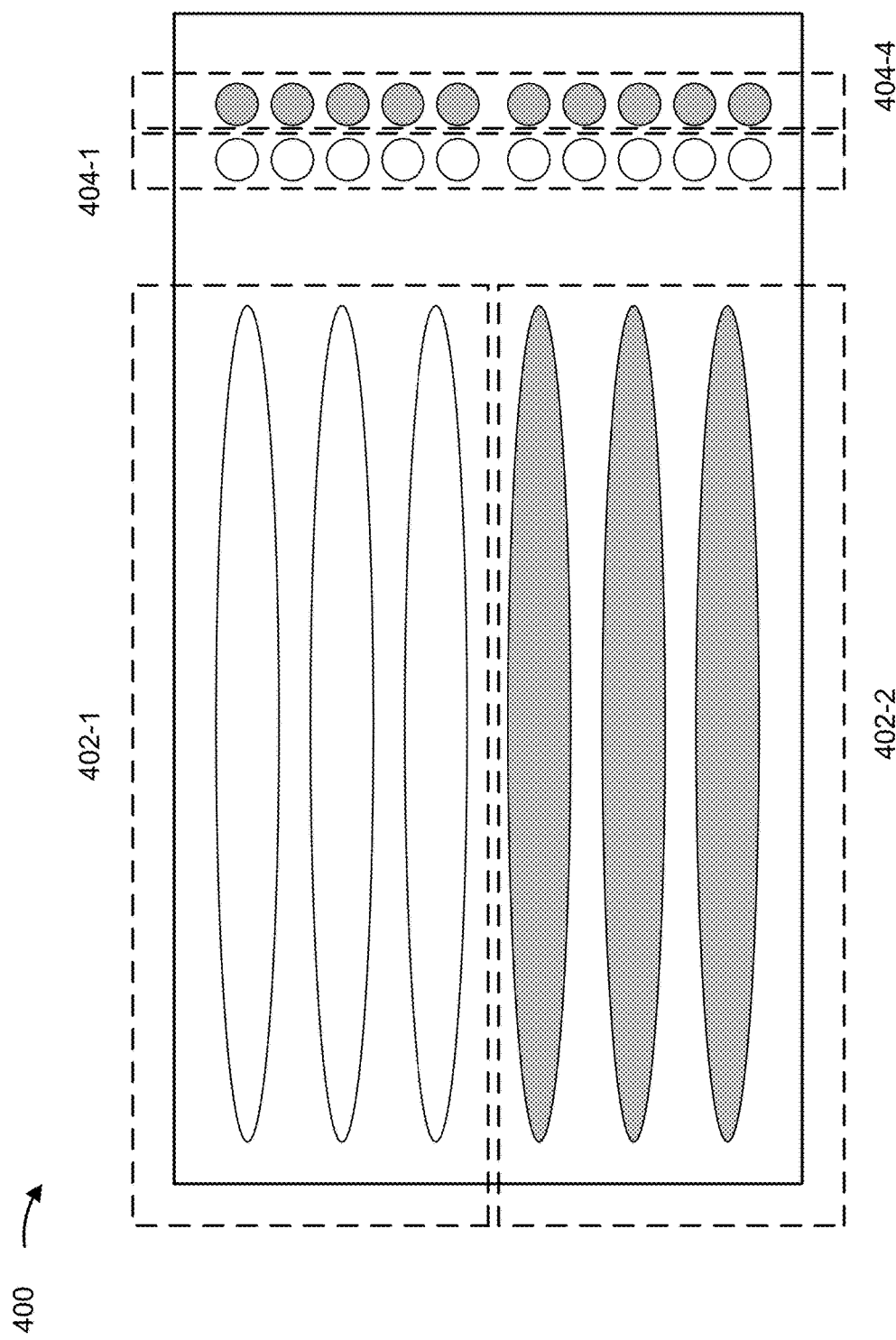
FIGS. 4A and 4B are diagrams of LCOS panels, in a twin M×N WSS, to perform add/drop port beam steering and common port beam steering.
Figure 4B:
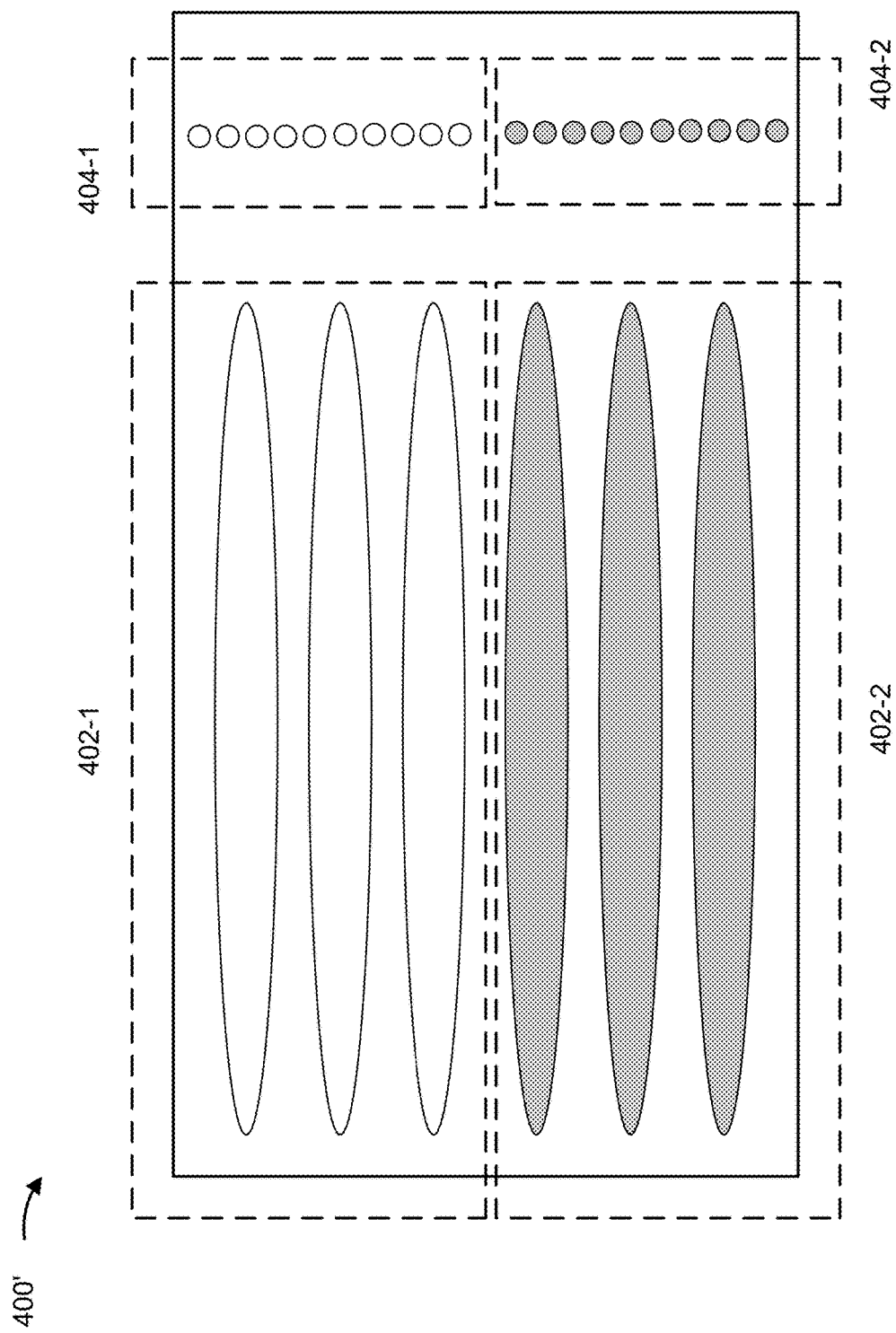

FIGS. 4A and 4B are diagrams of example of a steering engines 400/400' described herein. As shown in FIGS. 4A and 4B, steering engine 400 may include a first panel section 402-1 and a second panel section 404-1 for a first M×N WSS and may include a third panel section 402-2 and a fourth panel section 404-2 for a second M×N WSS. In this case, first panel section 402-1 and third panel section 402-2 may include areas for receiving dispersed spectrum beams associated with common port beam steering. In contrast, second panel section 404-1 and fourth panel section 404-2 may include areas for receiving concentrated, non-dispersed spectrum beams associated with add/drop port beam steering. As shown, different geometric configurations of panel sections within steering engines 400/400' may be possible.

In some implementations, first panel section 402-1 and third panel section 402-2 may be considered a single panel section and second panel section 404-1 and fourth panel section 404-4 may be considered another single panel section. In some implementations, other arrangements of panel sections may be possible, such as other quantities of panel sections, other layouts of panel sections, and/or the like. In this way, steering engine 400 enables deployment of a twin M×N WSS (e.g., twin 4×16 WSSs), a triple M×N WSS, a quad M×N WSS, and/or the like with a reduced form factor, reduced cost, and improved durability relative to deploying 2 or even 4 MEMS micromirror arrays to perform beam steering for the twin M×N WSS.

In some implementations, each common port beam (e.g., each 3 common port respectively associated with first panel section 402-1 and third panel section 402-2) may be steerable from associated common ports to any add/drop port (e.g., via the set of 10 areas of each respectively associated with second panel section 404-1 and fourth panel section 404-4). In some implementations, the common port beams and the add/drop port beams may be associated with a maximum steering angle relating to a quantity of areas for beam steering.

As indicated above, FIG. 4 is provided merely as an example. Other examples may differ from what is described with regard to FIG. 4.

Figure 5:
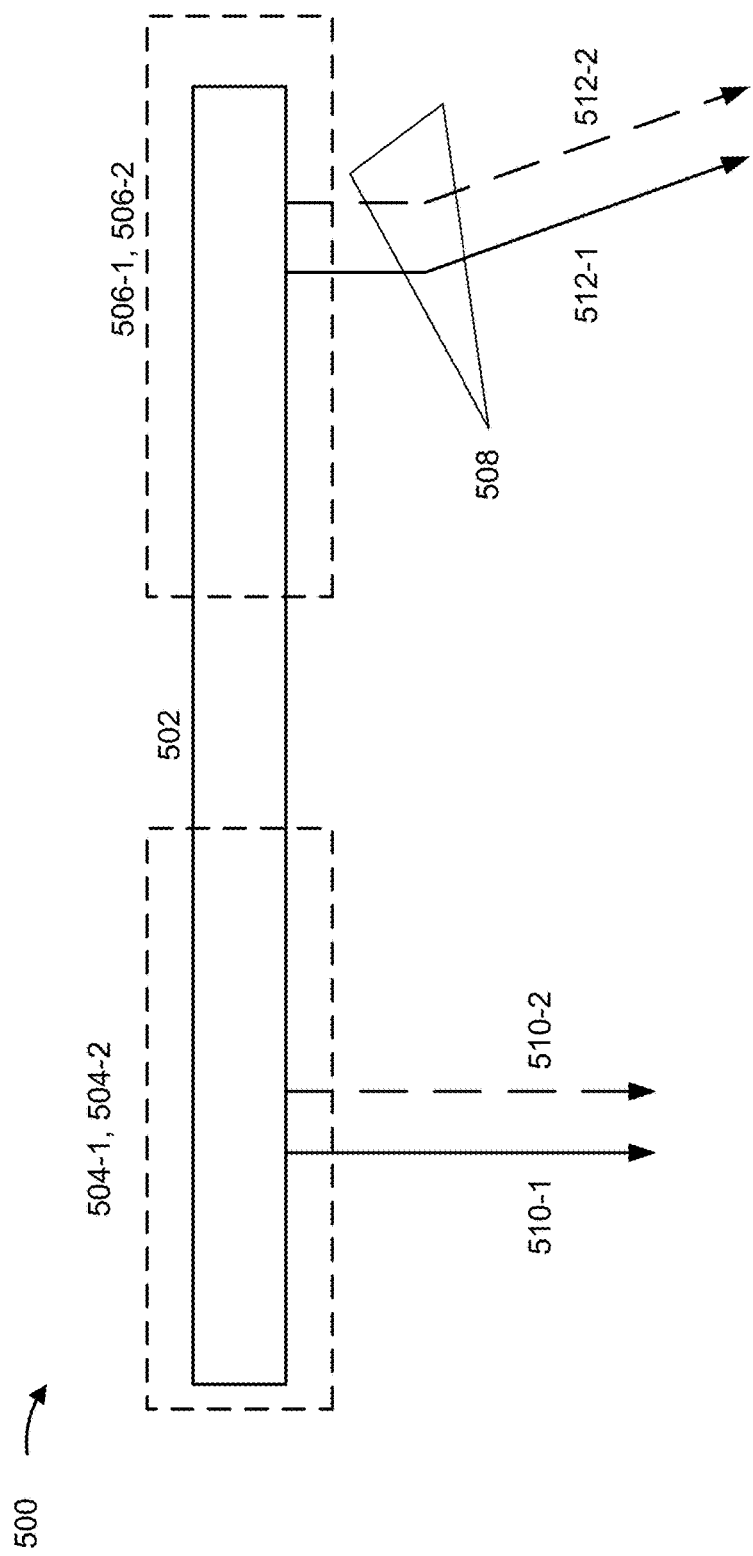
FIG. 5 is a diagram of an LCOS panel, in a twin M×N WSS, with a prism in an optical path of add/drop port beams or common port beams.

FIG. 5 is a diagram of an example implementation 500 of a beam steering engine 502, which includes panel sections 504 and 506, and optical element 508 aligned to beam steering engine 502. As shown in FIG. 5, beam steering engine 502 may include first and second panel sections 504-1 and 504-2 for first beam steering of first beams 510-1 and 510-2 (e.g., common port beam steering for corresponding WSSs of a twin M×N WSS) and third and fourth panel sections 506-1 and 506-2 for second beam steering of second beams 512-1 and 512-2 (e.g., add/drop port beam steering for the corresponding WSSs). In this case, optical element 508 is aligned to third and fourth panel sections 506-1 and 506-2 to divert beams 512-1 and 512-2 to a different direction than beams 510-1 and 510-2. Although first and second panel sections 504-1 and 504-2 and third and fourth panel sections 506-1 and 506-2 are shown as conceptually separate sections that are side-by-side, other configurations are possible, such as configurations where areas for beam steering for non-dispersed beams are interspersed with areas for beam steering for dispersed beams.

In this way, optical element 506 enables use of beam steering engine 502 for multiple functionalities (e.g., the first beam steering and the second beam steering) by ensuring that beams 510 are directed to different optical components within the twin M×N WSS than beams 512. In some implementations, optical element 506 may be a prism, a mirror (e.g., a fold mirror, and/or the like). In some implementations, rather than optical element 506 being aligned to third and fourth panel sections 506-1 and 506-2 to divert beams 512, optical element 506 may be aligned to first and second panel sections 504-1 and 504-2 to divert beams 510. In another example, rather than using an optical element 508, such as a prism, beam steering engine 502 may be aligned to, for example, a liquid crystal polarization rotator cell and a birefringent prism.

As indicated above, FIG. 5 is provided merely as an example. Other examples may differ from what is described with regard to FIG. 5.

Figure 6:
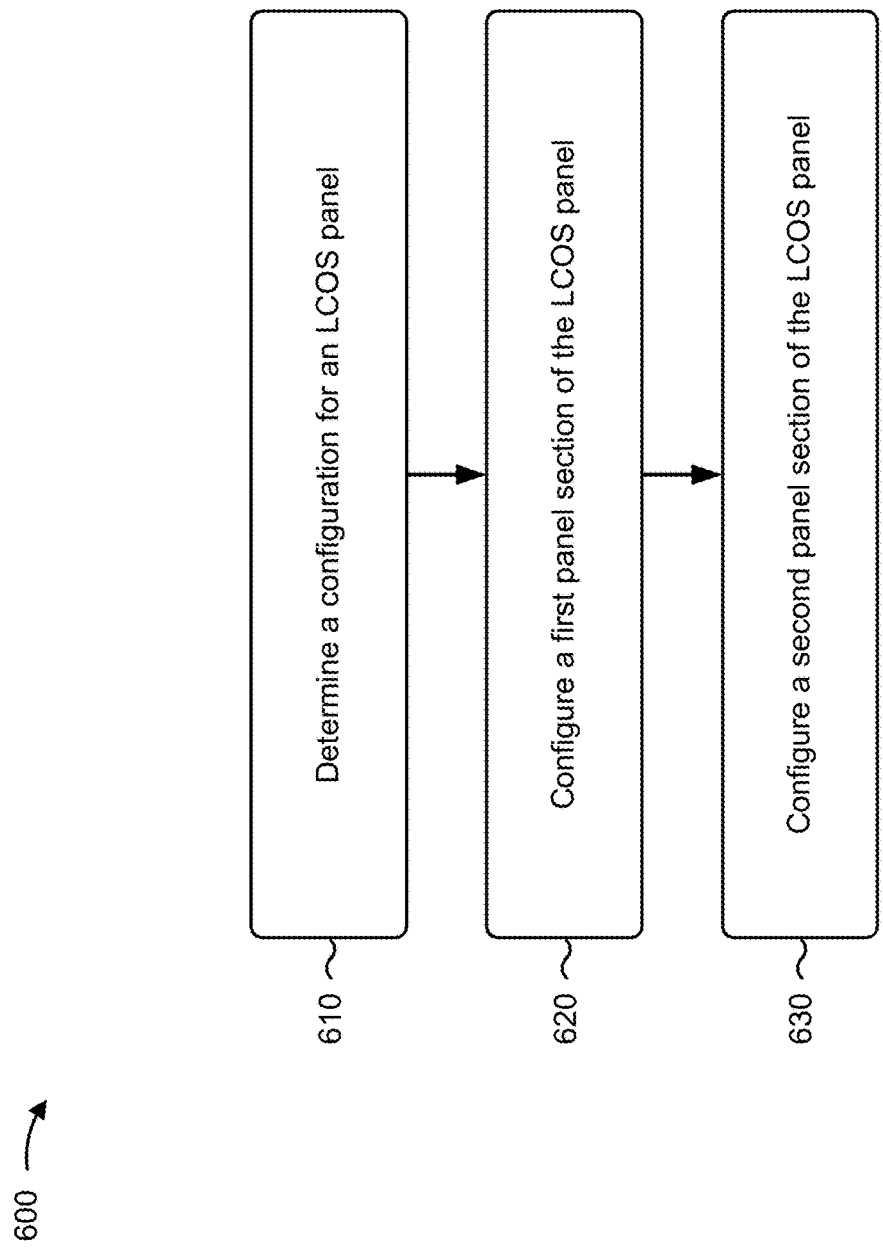
FIG. 6 is a flowchart of an example process for configuring a beam steering engine to perform add/drop port beam steering and common port beam steering in a WSS.

FIG. 6 is a flowchart of an example process 600 for configuring a beam steering engine to perform add/drop port beam steering and common port beam steering in a WSS. In some implementations, one or more process blocks of FIG. 6 may be performed by a control device, such as a control device of a WSS, a control device of an optical communications system, a control device external to the optical communications system, and/or the like.

As shown in FIG. 6, process 600 may include determining a configuration for a LCOS panel (block 610). For example, the control device (e.g., using one or more processors, one or more memories, and/or the like) may determine the configuration for the LCOS panel, as described above. For example, the control device may identify a set of panel sections to assign for a set of beam steering functionalities. In this case, the control device may identify a first panel section for a dispersed beam steering functionality (e.g., common port beam steering) a second panel section for a non-dispersed beam steering functionality (e.g., add/drop port beam steering), and/or the like. In some implementations, the control device may identify an arrangement for the set of panel sections. For example, the control device may determine where to define the set of panel sections based on an arrangement of optical components in a WSS that includes the LCOS. In some implementations, the control device may identify panel sections for multiple WSSs. For example, in a twin WSS configuration, the control device may identify panel sections for beam steering for a first WSS and panel sections for beam steering for a second WSS. Additionally, or alternatively, the control device may identify panel sections for higher density WSS configurations, such as routing devices with greater than two WSSs in a single optical node.

As further shown in FIG. 6, process 600 may include configuring a first panel section of the LCOS panel (block 620). For example, the control device (e.g., using one or more processors, one or more memories, and/or the like) may configure the first panel section of the LCOS panel, as described above. In some implementations, the control device may transmit a control signal to the LCOS panel to configure the first panel section. For example, the control device may instruct the LCOS panel to assign a subset of pixels to a particular configuration to perform a particular beam steering functionality, thereby defining the first panel section. In some implementations, the control device may instruct the LCOS panel to assign the subset of pixels to multiple configurations. For example, the control device may configure a first group of pixels to perform beam steering for a first beam (e.g., a wavelength channel sub-beam), a second group of pixels to perform beam steering for a second beam, a third group of pixels to perform beam steering for a third beam, and/or the like. In this way, the LCOS panel enables beam steering for an M×N WSS, a twin M×N WSS, a higher density (e.g., three or more) M×N WSS, and/or the like.

As further shown in FIG. 6, process 600 may include configuring a second panel section of the LCOS panel (block 630). For example, the control device (e.g., using one or more processors, one or more memories, and/or the like) may configure the second panel section of the LCOS panel, as described above. In some implementations, the control device may transmit a control signal to the LCOS panel to configure the second panel section. For example, the control device may instruct the LCOS panel to assign a subset of pixels to a particular configuration to perform a particular beam steering functionality, thereby defining the first panel section. In some implementations, the control device may configure the first panel section and the second panel section (and/or any other panel sections) using a single control signal. In some implementations, the control device may configure the first panel section using a first control signal and the second panel section using a second control signal.

Process 600 may include additional implementations, such as any single implementation or any combination of implementations described herein and/or in connection with one or more other processes described elsewhere herein.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical device, comprising:
   a monolithic beam steering engine; and
   a twin M×N wavelength selective switch (WSS) including
      a first M×N WSS and a second M×N WSS,
      the first M×N WSS comprising:
         a first panel section of the monolithic beam steering engine to perform first beam steering of first beams,
            wherein the first beam steering is add/drop port beam steering, and
            wherein the first panel section has a first geometric configuration;
         a second panel section of the monolithic beam steering engine to perform second beam steering of second beams,
            wherein the second beam steering is common port beam steering, and
            wherein the second panel section has a second geometric configuration different from the first geometric configuration; and
         a first optical element aligned to the monolithic beam steering engine to direct one of the first beams or the second beams relative to the other of the first beams or the second beams, such that the first beams are directed in a different direction from the second beams, and
      the second M×N WSS comprising:
         a third panel section of the monolithic beam steering engine to perform third beam steering of third beams,
            wherein the third beam steering is add/drop port beam steering, and
            wherein the third panel section has the first geometric configuration;
         a fourth panel section of the monolithic beam steering engine to perform fourth beam steering of fourth beams,
            wherein the fourth beam steering is common port beam steering, and
            wherein the fourth panel section has the second geometric configuration; and
         a second optical element aligned to the monolithic beam steering engine to direct one of the third beams or the fourth beams relative to the other of the third beams or the fourth beams, such that the third beams are directed in a different direction from the fourth beams.

2. The optical device of claim 1, wherein the first beams are non-dispersed spectrum beams and the second beams are dispersed spectrum beams.

3. The optical device of claim 1, wherein the third beams are non-dispersed spectrum beams and the fourth beams are dispersed spectrum beams.

4. The optical device of claim 1, wherein the first optical element and the second optical element are a same optical element.

5. An M×N wavelength selective switch (WSS), comprising:
- a monolithic beam steering engine, comprising:
  - a first panel section to perform first beam steering of first beams,
    - wherein the first beam steering is add/drop port beam steering, and
    - wherein the first panel section has a first geometric configuration;
  - a second panel section to perform second beam steering of second beams,
    - wherein the second beam steering is common port beam steering, and
    - wherein the second panel section has a second geometric configuration different from the first geometric configuration;
  - a third panel section to perform third beam steering of third beams,
    - wherein the third beam steering is add/drop port beam steering, and
    - wherein the third panel section has the first geometric configuration; and
  - a fourth panel section to perform fourth beam steering of fourth beams,
    - wherein the fourth beam steering is common port beam steering, and
    - wherein the fourth panel section has the second geometric configuration; and
- at least one optical element aligned to the beam steering engine to:
  - direct one of the first beams or the second beams relative to the other of the first beams or the second beams, such that the first beams are directed in a different direction from the second beams, and
  - direct one of the third beams or the fourth beams relative to the other of the third beams or the fourth beams, such that the third beams are directed in a different direction from the fourth beams.

6. The M×N WSS of claim 5, wherein the at least one optical element is aligned to the first panel section to direct the first beams in a first direction that is different from a second direction of the second beams.

7. The M×N WSS of claim 5, wherein the at least one optical element is aligned to the second panel section to direct the second beams in a second direction that is different from a first direction of the first beams.

8. The M×N WSS of claim 5, wherein the first panel section includes areas for receiving the first beams that are larger relative to areas on the second panel section for receiving the second beams.

9. The M×N WSS of claim 5, wherein an optical path between the monolithic beam steering engine and the at least one optical element is direct.

10. The M×N WSS of claim 5, wherein the at least one optical element is at least one of a mirror or a prism.

11. The M×N WSS of claim 5, wherein the monolithic beam steering engine is a liquid crystal on silicon (LCOS) panel.

12. The M×N WSS of claim 5, further comprising:
a set of add ports aligned to the first panel section; and
a set of drop ports aligned to the first panel section.

13. The M×N WSS of claim 5, further comprising:
a set of common ports aligned to the second panel section.

14. The M×N WSS of claim 5, further comprising:
an optical path for a dispersed spectrum beam, comprising:
- a first path section from a common port to the second panel section,
- a second path section from the second panel section to one or more optical components,
- a third path section from the one or more optical components to the first panel section, and
- a fourth path section from the first panel section to an add port or drop port.

15. The M×N WSS of claim 14, wherein the at least one optical element is disposed in one of the second path section or the third path section.

16. The M×N WSS of claim 5, wherein the M×N WSS is one of:
a twin M×N WSS,
a triple M×N WSS, or
a quad M×N WSS.

17. A method of controlling an M×N wavelength selective switch (WSS), comprising:
- configuring, by a device, a first panel section of a monolithic beam steering engine to perform first beam steering of first beams,
  - wherein the first panel section has a first geometric configuration;
- configuring, by the device, a second panel section of the monolithic beam steering engine to perform second beam steering of second beams,
  - wherein the second panel section has a second geometric configuration different from the first geometric configuration, and
  - wherein one of the first panel section or the second panel section is aligned to at least one optical element to separate a direction of the first beams from the second beams;
- configuring, by the device, a third panel section of the monolithic beam steering engine to perform third beam steering of third beams,
  - wherein the third panel section has the first geometric configuration; and
- configuring, by the device, a fourth panel section of the monolithic beam steering engine to perform second beam steering of second beams,
  - wherein the fourth panel section has the second geometric configuration, and
  - wherein one of the third panel section or the fourth panel section is aligned to the at least one optical element to separate a direction of the third beams from the fourth beams.

18. The method of claim 17, wherein configuring the first panel section comprises:
configuring pixels of a liquid crystal on silicon (LCOS) panel.

19. The method of claim 17, wherein configuring the second panel section comprises:
configuring pixels of a liquid crystal on silicon (LCOS) panel.

20. The method of claim 17, wherein the monolithic beam steering engine is configured to at least one of:
have steering angles less than a threshold angle, or
perform beamforming for less than a threshold quantity of ports.

* * * * *